US012330908B2

(12) United States Patent
Pahlke et al.

(10) Patent No.: US 12,330,908 B2
(45) Date of Patent: Jun. 17, 2025

(54) WIRELESS COMMUNICATION IN AN ELEVATOR SYSTEM USING A PLURALITY OF RADIO CHANNELS

(71) Applicant: Otis Elevator Company, Farmington, CT (US)

(72) Inventors: Derk Pahlke, Berlin (DE); Mario Pink, Berlin (DE); Goran Djuknic, New York, NY (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1579 days.

(21) Appl. No.: 16/406,803

(22) Filed: May 8, 2019

(65) Prior Publication Data

US 2019/0344997 A1 Nov. 14, 2019

(30) Foreign Application Priority Data

May 9, 2018 (EP) ..................................... 18171523

(51) Int. Cl.
*B66B 1/34* (2006.01)
*H04W 84/02* (2009.01)

(52) U.S. Cl.
CPC .......... *B66B 1/3461* (2013.01); *B66B 1/3407* (2013.01); *B66B 1/3492* (2013.01); *H04W 84/02* (2013.01)

(58) Field of Classification Search
CPC .... B66B 1/24; B66B 1/28; B66B 1/34; B66B 1/3407; B66B 1/3446–3461; B66B 1/3492
See application file for complete search history.

(56) References Cited

U.S. PATENT DOCUMENTS 5,682,024 A * 10/1997 Koopman, Jr. ........... B66B 1/50
187/394
6,976,561 B2 * 12/2005 Motoyama ............ B66B 1/3415
187/247

(Continued)

FOREIGN PATENT DOCUMENTS

CN 105000438 A 10/2015
CN 103476101 B 4/2017

(Continued)

OTHER PUBLICATIONS

Chuang, J.C.-I., et al., "Performance of autonomous dynamic channel assignment and power control for TDMA/FDMA wireless access", Abstract, IEEE Journal on Selected Areas in Communications ( vol. 12 , Issue: 8 , Oct. 1994 ), 1 page.

(Continued)

*Primary Examiner* — Christopher Uhlir
(74) *Attorney, Agent, or Firm* — CANTOR COLBURN LLP

(57) ABSTRACT

An elevator system (2) comprises an elevator car (6) configured for traveling along a hoistway (4); a sensor (19) configured for determining the current position of the elevator car (6) within the hoistway (4); at least one stationary wireless communication module (20) arranged within or close to the hoistway (4); and a mobile wireless communication module (22) attached to the elevator car (6). The wireless communication modules (20, 22) are configured to communicate with each other via a wireless data connection. The wireless communication modules (20, 22) are further configured for communication via one of a plurality of radio channels and selecting the radio channel used for the communication from the plurality of radio channels based on the current position of the elevator car (6) within the hoistway (4).

15 Claims, 2 Drawing Sheets

(56) References Cited

U.S. PATENT DOCUMENTS

| | | | |
|---|---|---|---|
| 7,107,012 B2 | 9/2006 | Kashiwagi et al. | |
| 8,584,810 B2 * | 11/2013 | Tokura | B66B 1/3407 |
| | | | 187/382 |
| 9,352,944 B2 | 5/2016 | Fagan et al. | |
| 9,450,652 B2 | 9/2016 | Takei | |
| 2005/0020266 A1 | 1/2005 | Backes et al. | |
| 2006/0029023 A1 | 2/2006 | Cervello et al. | |
| 2012/0129458 A1 | 5/2012 | Yim et al. | |
| 2013/0126277 A1 * | 5/2013 | Friedman | B66B 3/00 |
| | | | 187/384 |
| 2014/0045479 A1 | 2/2014 | Shinada et al. | |
| 2015/0127697 A1 | 5/2015 | Marvin et al. | |
| 2017/0174471 A1 | 6/2017 | Salmikuukka et al. | |
| 2017/0291800 A1 | 10/2017 | Scoville et al. | |

FOREIGN PATENT DOCUMENTS

| | | |
|---|---|---|
| CN | 106603668 A | 4/2017 |
| CN | 107809270 A | 3/2018 |
| EP | 3138800 A1 | 3/2017 |
| JP | 2005119760 A | 5/2005 |
| JP | 2013193854 A | 9/2013 |
| WO | 2017152055 A1 | 9/2017 |

OTHER PUBLICATIONS

European Search Report for application 18171523.6, dated Dec. 7, 2018, 7 pages.

Lee, Youngseok, et al., "Optimization of AP placement and channel assignment in wireless LANs", Abstract, 27th Annual IEEE Conference on Local Computer Networks, 2002. Proceedings. LCN 2002., 1 page.

Chinese Office Action for Application No. 201910384390.X, Issued Mar. 3, 2021, 6 Pages.

\* cited by examiner

| h [m] | n |
|---|---|
| 29 | 1 |
| 28 | 1 |
| 27 | 1 |
| 26 | 1 |
| 25 | 1 |
| 24 | 1 |
| 23 | 1 |
| 22 | 1 |
| 21 | 1 |
| 20 | 1 |
| 19 | 1 |
| 18 | 1 |
| 17 | 6 |
| 16 | 6 |
| 15 | 6 |
| 14 | 6 |
| 13 | 6 |
| 12 | 11 |
| 11 | 11 |
| 10 | 11 |
| 9 | 11 |
| 8 | 11 |
| 7 | 11 |
| 6 | 11 |
| 5 | 11 |
| 4 | 11 |
| 3 | 1 |
| 2 | 1 |
| 1 | 1 |

Fig. 2

WIRELESS COMMUNICATION IN AN ELEVATOR SYSTEM USING A PLURALITY OF RADIO CHANNELS

FOREIGN PRIORITY

This application claims priority to European Patent Application No. 18171523.6, filed May 9, 2018, and all the benefits accruing therefrom under 35 U.S.C. § 119, the contents of which in its entirety are herein incorporated by reference.

BACKGROUND

The invention relates to an elevator system, in particular to an elevator system allowing wireless communication with a moving elevator car.

An elevator system comprises at least one elevator car traveling along a hoistway between a plurality of landings. Establishing a wireless data connection with the elevator car allows transmitting data to and from the elevator car without providing a wired connection between the moving elevator car and a stationary control unit. For example control signals or data relevant for passengers may be transmitted while the elevator car is moving, or passengers may even wirelessly communicate with communication partners elsewhere while traveling from one floor to another. A wireless data connection with the elevator car further may be used for providing wireless communication such as WLAN, cellular links or 5G, to passengers within the elevator car.

It therefore is desirable to provide a reliable wireless data connection between a mobile wireless communication module attached to the elevator car and a stationary wireless communication module arranged within or close to the hoistway.

SUMMARY

According to an exemplary embodiment of the invention, an elevator system comprises an elevator car configured for traveling along a hoistway; a sensor configured for determining the current position of the elevator car within the hoistway; at least one stationary wireless communication module arranged within or close to the hoistway; and a mobile wireless communication module attached to the elevator car. The wireless communication modules, which provide a wireless communication system, are configured for communicating with each other via a wireless data connection using one of a plurality of radio channels. The wireless communication modules are further configured for selecting the radio channel to be used for communicating from the plurality of radio channels based on the current position of the elevator car within the hoistway.

According to an exemplary embodiment of the invention, a method of communicating via a wireless data connection between a mobile wireless communication module attached to an elevator car traveling along a hoistway and a stationary wireless communication module comprises determining the current position of the elevator car within the hoistway; and selecting a radio channel to be used for communicating via the wireless data connection from a plurality of radio channels based on the determined position of the elevator car.

According to exemplary embodiments of the invention, the wireless communication modules are configured to switch automatically and proactively between different radio channels without the need for continuously determining the current quality of the communication on the currently chosen radio channel. The radio channels to be used may be predetermined according to a respective position of the elevator car, and each position of the elevator car may be assigned to a respective predetermined radio channel. This allows fast switching between the radio channels as the elevator car moves along the hoistway. According to exemplary embodiments of the invention, the radio channels may be switched even before the quality of the communication using the current radio channel considerably deteriorates. Thus, no time is spent for searching a new radio channel allowing for a better data transmission after the quality of the communication on the current radio channel has considerably deteriorated. Therefore, it is possible to continuously realize a high quality of the wireless data transmission, particularly avoiding time interruptions in the wireless communication when switching to a new channel is required. Such a reliable wireless data transmission allows controlling the elevator system via the wireless data connection, i.e. without using a wired data connection between the elevator car and a stationary control. This significantly reduces the complexity and costs of the elevator system.

A number of optional features are set out in the following. These features may be realized in particular embodiments, alone or in combination with any of the other features.

The elevator system may be configured for performing a normal run, i.e. a run which is intended for transporting passengers. The normal run comprises moving the elevator car along the hoistway between a starting floor and a destination floor, determining the current position of the elevator car within the hoistway as required for controlling motion of the elevator, e.g. according to a motion profile, and selecting a radio channel to be used for communicating via the wireless data connection based on the determined current position of the elevator car within the hoistway while traveling between the starting floor and the destination floor.

The wireless communication module may be configured for selecting the radio channel to be used for communicating via the wireless data connection from a channel table, in which selected positions of the elevator car within the hoistway are associated with one of the plurality of radio channels as a predetermined radio channel, respectively. Using such a channel table allows a very fast switching between the radio channels to be used for the wireless data connection during the movement of the elevator car.

The normal run may further include determining a radio channel allowing communication via the wireless data connection from the plurality of radio channels at selected positions of the elevator car within the hoistway while the elevator car travels between the starting floor and the destination floor, and updating the channel table by storing the determined radio channel as the new respective predetermined radio channel together with the associated position of the elevator car in the channel table. This in particular may include replacing a previously stored radio channel associated with the same position of the elevator car.

Determining a radio channel allowing communication via the wireless data connection in particular may include determining a radio channel allowing proper communication via the wireless data connection, i.e. a communication with a predefined sufficient transmission quality, or determining the radio channel from the plurality of radio channels which allows the best communication via the wireless data connection.

Updating the channel table during normal runs allows selecting always suitable or even the best radio channels, i.e. the radio channels allowing proper or even the best communication via the wireless data connection, even under changing circumstances which may result in varying transmission properties of the individual channels. Switching from one predetermined radio channel to another predetermined radio channel may be effected fast since the predetermined radio channels are fixedly associated with the position of the elevator car and therefore no time is required for searching for another suitable radio channel.

For generating the channel table, the elevator system may be configured for performing a learning run, the learning run comprising (i) moving the elevator car along the hoistway; (ii) for selected positions of the elevator car within the hoistway, determining the radio channel from the plurality of radio channels which allows communication via the wireless data connection; (iii) storing the determined radio channel as the predetermined radio channel together with the respective associated position of the elevator car in the channel table; and (iv) repeating steps (ii) and (ii) for a selected number of different positions of the elevator car within the hoistway.

This in particular may include determining at every selected position a radio channel allowing a sufficiently good communication via the wireless data connection or determining at every selected position the radio channel from the plurality of radio channels which allows the best communication via the wireless data connection.

Performing such a learning run allows generating the channel table easily on site. When a learning run is performed, the wireless communication modules do not need to be configured in the factory based on theoretical considerations or simulations of the respective elevator system. In consequence, a proper or even the best configuration (radio channel table) is determined for every individual elevator system.

The inventors have found out that selection of a most effective radio channel in an elevator system comprising a wireless communication system including a plurality of wireless communication modules is a particular characteristic of the respective hoistway and does not change significantly after the elevator system has been installed in the hoistway. Therefore, the assignment of predetermined radio channels to respective positions of the elevator car in the hoistway is a unique characteristic (or signature) for each hoistway. This characteristic may be determined during the learning run and may used for providing uninterrupted and high quality wireless communication to the elevator car while moving along the hoistway.

In order to allow for a reliable and exact determination of suitable or even the best radio channels, the maximum speed of the elevator car during the learning run may be set slower than the maximum speed of the elevator car during a normal run.

Alternatively or additionally, the elevator car may be stopped at selected positions along the hoistway during the learning run in order to allow an exact determination of suitable or even the best radio channels at the respective positions.

For allowing a good communication via the wireless data connection over the whole length (height) of the hoistway, the elevator system may comprise a plurality of stationary wireless communication modules. The stationary wireless communication modules in particular may be distributed over a plurality of positions along the height of the hoistway. The mobile wireless communication module may be configured for switching between communicating with different stationary wireless communication modules based on the determined current position of the elevator car along the hoistway.

A plurality of mobile wireless communication modules may be provided at the elevator car. For example, one wireless communication module may be provided on top of the elevator car and another wireless communication module may be provided at the bottom of the elevator car. The wireless communication system may be configured to switch between the mobile wireless communication modules depending on the current position of the elevator car.

DESCRIPTION OF DRAWINGS

In the following an exemplary embodiment of the invention is described with reference to the enclosed figures.

FIG. 2 depicts an example of a channel table associating positions of the elevator car within the hoistway with one of a plurality of radio channels, respectively.

DETAILED DESCRIPTION

Figure 1:
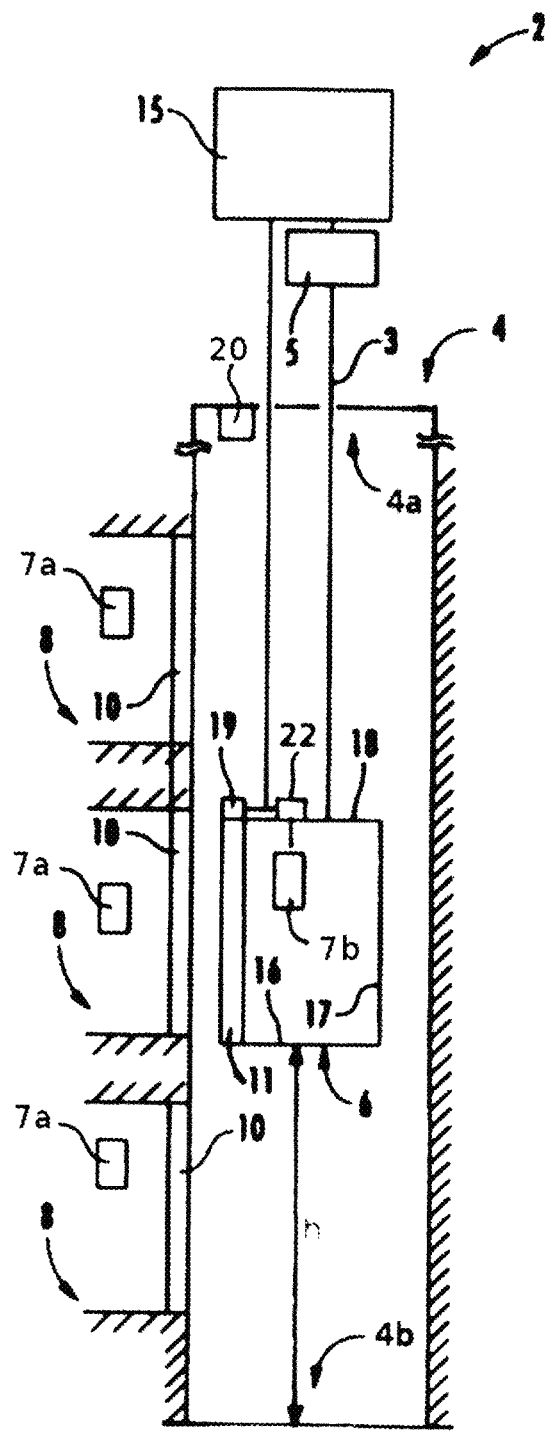
FIG. 1 schematically depicts an elevator system comprising an elevator car according to an exemplary embodiment of the invention.

FIG. 1 schematically depicts an elevator system 2 comprising an elevator car 6 according to an exemplary embodiment of the invention.

The elevator system 2 comprises a hoistway 4 extending in a vertical direction between a plurality of landings 8 located on different floors.

The elevator car 6 comprises a floor 16, a ceiling 18 and sidewalls 17 extending between the floor 16 and the ceiling 18 defining an interior space of the elevator car 6. Only one sidewall 17 is depicted in the schematic illustration of FIG. 1.

The elevator car 6 is movably suspended within the hoistway 4 by means of a tension member 3. The tension member 3, for example a rope or belt, is connected to a drive 5, which is configured for driving the tension member 3 in order to move the elevator car 6 along the longitudinal direction/height of the hoistway 4 between the plurality of landings 8.

Each landing 8 is provided with a landing door (elevator hoistway door) 10, and the elevator car 6 is provided with a corresponding elevator car door 11 allowing passengers to transfer between a landing 8 and the interior space of the elevator car 6 when the elevator car 6 is positioned at the respective landing 8.

The exemplary embodiment of the elevator system 2 shown in FIG. 1 employs a 1:1 roping for suspending the elevator car 6. The skilled person, however, easily understands that the type of the roping is not essential for the invention and that different kinds of roping, e.g. a 2:1 roping, may be used as well. The elevator system 2 may further include a counterweight (not shown) moving concurrently and in opposite direction with respect to the elevator car 6. Alternatively, the elevator system 2 may be an elevator system 2 without a counterweight, as it is shown in FIG. 1. The drive 5 may be any form of drive used in the art, e.g. a traction drive, a hydraulic drive or a linear drive. The elevator system 2 may have a machine room or may be a machine room-less elevator system. The elevator system 2 may use a tension member 3, as it is shown in FIG. 1, or it may be an elevator system without a tension member 3, comprising e.g. a hydraulic drive or a linear drive (not shown).

The drive 5 is controlled by an elevator control 15 for moving the elevator car 6 along the hoistway 4 between the different landings 8.

Input to the elevator control 15 may be provided via elevator hall call buttons 7a, which are provided on each landing 8 close to the elevator landing doors 10, and/or via elevator car control buttons 7b provided inside the elevator car 6.

The elevator hall call buttons 7a and the elevator car control buttons 7b may be connected to the elevator control 15 by means of electrical lines, which are not shown in FIG. 1, in particular by an electric bus, e.g. a field bus such as a CAN bus, or by means of wireless data transmission.

In order to determine the current position of the elevator car 6, the elevator car 6 is provided with a position sensor 19. This, however, is only an example and the skilled person will understand that any suitable methods and/or devices for determining the position of the elevator car 6 within the hoistway 4 may be employed.

A stationary wireless communication module 20, such as a WLAN access point or a wireless router, is arranged at an upper end 4a of the hoistway 4, and a mobile wireless communication module 22, such as a WLAN access point or a wireless router, is attached to the elevator car 6.

The position sensor 19 and the mobile wireless communication module 22 may be arranged on top of the elevator car 6 as shown in FIG. 1. Alternatively, the position sensor 19 and/or the mobile wireless communication module 22 may be provided at a side of the elevator car 6 or at the bottom, e.g. below a floor 16, of the elevator car 6. If desired, more than one mobile wireless communication module 22 may be provided. In this case, the wireless communication system may be configured such as to switch between the mobile wireless communication modules 22, such that one or more of the wireless communication modules 22 are active, depending on the position of the elevator car 6 in the hoistway 4.

The position of the at least one stationary wireless communication module 20 at the upper end of the hoistway 4 as depicted in FIG. 1 is only an example. Alternatively or additionally, at least one stationary wireless communication module 20 may arranged at the bottom 4b of the hoistway 4 or at intermediate positions, e.g. at at least one of the landings 8.

In operation, a wireless data connection is established between the at least one stationary wireless communication module 20 and the at least one mobile wireless communication module 22.

The at least one stationary wireless communication module 20 and the at least one mobile wireless communication module 22 are configured for communicating with each other via a wireless data connection using one of a plurality of radio channels. For establishing the wireless data connection, the communication modules 20, 22 need to agree on a common radio channel to be used.

Due to multipath propagation and other physical effects which may occur within the hoistway 4, a particular radio channel allowing proper or even the best communication at a certain position of the elevator car 6 within the hoistway 4 may not allow proper communication at other positions in the hoistway. However, other radio channels may provide better communication at such other positions of the elevator car 6 within the hoistway 4. It has been observed that for a particular hoistway 4, there is a unique relationship of the optimum radio channel for each position of the elevator car 6 within the hoistway 4. This unique relationship allows predetermining a suitable or even the best radio channel for each position of the elevator car 6 within the hoistway 4 in advance and switching to the predetermined radio channel depending on the position of the elevator car 6 within the hoistway 4.

Thus, according to an exemplary embodiment of the invention, the radio channel used for the communication between the communication modules 20, 22 is selected based on the current position (height h) of the elevator car 6 within the hoistway 4, in particular on the positional information provided by the position sensor 19.

The positional information provided by the position sensor 19 may be continuous or small-grained information. The positional information e.g. may indicate the distance (height h) of the elevator car 6 from the bottom 4b of the hoistway 4, or the distance of the elevator car 6 from the upper end 4a of the hoistway 4. The positional information may be given in meters, centimeters, millimeters, inch or any other unit representing a distance.

Alternatively, the positional information provided by the position sensor 19 may be more coarsely, e.g. indicating the landing 8 next to the current position of the elevator car 6.

The wireless communication modules 20, 22 may be configured for selecting the radio channel to be used for the communication via the wireless data connection from a channel table 25 stored within at least one of the wireless communication modules 20, 22. An example of such a channel table 25 is depicted in FIG. 2.

The channel table 25 associates selected positions of the elevator car 6, which for example may be denoted by the height h of the elevator car 6 from the bottom 4b of the hoistway 4 (shown in the left column of the channel table 25) with a number # denoting one of the available radio channels (shown in the right column of the channel table 25).

According to the exemplary channel table 25 depicted in FIG. 2, radio channel "1" is selected when the elevator car 6 is positioned between 0 m and 3 m above the bottom 4b of the hoistway 4.

When the elevator car 6 is positioned between 4 m and 12 m above the bottom 4b of the hoistway 4, radio channel "11" is selected.

When the elevator car 6 is positioned between 13 m and 17 m above the bottom 4b of the hoistway 4, radio channel "6" is selected.

Radio channel "1" is selected again, when the elevator car 6 is positioned 18 m or more above the bottom 4b of the hoistway 4.

Evidently the channel table 25 may define the radio channels to be selected only for a finite number of positions along the hoistway 4. In the example shown in FIG. 2, radio channels to be selected are defined for 29 positions, each position being associated with an integer meter of height h of the elevator car 6 above the bottom 4b of the hoistway 4.

In case the elevator car 6 is located between two positions (heights h) for which an entry in the channel table 25 exists, the wireless communication modules 20, 22 may stick with the last selected radio channel until the elevator car 6 reaches a position for which an entry in the channel table 25 exists.

Alternatively, the wireless communication modules 20, 22 may use information indicating in which direction the elevator car 6 is currently moving in order to select the radio channel in agreement with the next entry in the channel table 25 towards which the elevator car 6 is currently moving, as soon as the elevator car 6 passed a position for which an entry in the channel table 25 exists.

As mentioned before, the channel table 25 shown in FIG. 2 is only an example. Depending on the respective circumstances and demands, the channel table may be finer comprising more entries, or a coarser channel table comprising fewer entries may be used.

For generating a channel table 25 as it is shown in FIG. 2, the elevator system 2 may perform a so called "learning run". In a learning run according to exemplary embodiments of the present invention, the elevator car 6 is moved along the hoistway 4. During the learning run, the maximum speed of the elevator car 6 may be set slower than the maximum speed of the elevator car 6 during normal operation.

The learning run further includes determining the radio channel allowing proper or even the best communication via the wireless data connection from the plurality of radio channels at selected positions of the elevator car 6 within the hoistway 4. For generating a channel table 25 as it is shown in FIG. 2, the radio channel allowing proper or even the best communication is determined for every meter of height h of the elevator car 6 above the bottom 4b of the hoistway 4.

This determination may be done by switching between the plurality of available radio channels and determining the quality of the data transmission over the selected radio channel at every selected position of the elevator car 6.

This in particular may include stopping the elevator car 6 at every selected position or moving the elevator car 6 slowly between the selected positions.

Information representing the radio channel allowing proper or even the best data transmission, e.g. a number # denoting said radio channel, is stored together with the respective position of the elevator car 6 in the channel table 25.

Optionally, the elevator system 2 may be configured for updating the channel table 25 during normal operation, i.e. after the channel table 25 has been generated and the wireless communication modules 20, 22 select the radio channels used for their mutual communication based on the current position of the elevator car 6 within the hoistway 4, as it has been described before.

For updating the channel table 25, the wireless communication modules 20, 22 are configured for determining the quality of the data transmission for a plurality of radio channels at selected positions of the elevator car 6 within the hoistway 4 during normal operation, e.g. when the elevator car 6 is positioned at one of the landings 8, and for comparing the determined qualities with the quality of data transmission achieved over the radio channel which has been previously determined as the preferred radio channel for the current position of the elevator car 6.

In case it is determined that an alternative radio channel allows for a better quality of data transmission than the previously determined radio channel associated with the current position of the elevator car 6, the respective entry within the channel table 25 is replaced by the new radio channel.

Regularly updating the channel table 25 ensures that always the radio channel allowing for sufficient or even the best quality of data transmission is used even under changing circumstances which may result in varying transmission properties of the different radio channels.

In case the position sensor 19 should be damaged so that it does not provide any position data, the information comprised in the channel table 25 may be used for "reversely" determining the current position of the elevator car 6 within the hoistway 4 at least coarsely by determining the radio channel providing sufficient or even the best quality of data transmission from the plurality of available radio channels.

In an ambiguous situation, as it is exemplarily represented by the channel table 25 shown in FIG. 2, in which an optimal radio channel corresponds with a plurality of potential positions of the elevator car 6, the last available information provided by the position sensor 19 or information about the previous optimal radio channel may be used for distinguishing between the potential positions of the elevator car 6.

For example, in a situation as it is represented by the channel table 25 shown in FIG. 2, an optimal radio channel of "1" may correspond to a height h between 0 m and 2 m, or to a height h above 12 m. When the previous optimal radio channel has been radio channel "11", it is very likely that the current position of the elevator car 6 is between 0 m and 2 m. In contrast, when the previous optimal radio channel has been radio channel "6", it is very likely that the current position of the elevator car 6 is more than 12 m.

Although for reasons of clarity, the invention has been described with respect to a conventional elevator system 2 comprising a single elevator car 6 traveling in only one dimension along a vertical hoistway 4, the skilled person will understand that exemplary embodiments of the invention may be similarly employed in elevator systems 2 comprising more than one elevator car 6. Exemplary embodiments of the invention also may be employed in multi-dimensional elevator systems 2 in which the at least one elevator car 6 may move not only vertically but also horizontally and/or diagonally.

In such a multi-dimensional elevator system 2, the radio channel to be used for the communication generally depends on two or three coordinates of the elevator car 6. Thus, the two-dimensional channel table 25 depicted in FIG. 2 is replaced by a "table" with three or four dimensions associating a preferred radio channel to the two- or three-dimensional coordinates indicating the position of the elevator car 6 in a multi-dimensional hoistway 4. The general principles, however, are the same as in the one-dimensional case which has been described in detail with reference to the enclosed figures.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 2 elevator system
3 tension member
4 hoistway
4a upper end of the hoistway
4b bottom of the hoistway
5 drive
6 elevator car
7a elevator hall call button
7b elevator cat control button
8 landing
10 landing door
11 elevator car door
15 elevator control
16 floor of the elevator car
17 sidewall of the elevator car 18 ceiling of the elevator car
19 position sensor
20 stationary wireless communication module
22 mobile wireless communication module
25 channel table
h height of the elevator car over the bottom of the hoistway

What is claimed is:

1. Elevator system (2) comprising:
   an elevator car (6) configured for traveling along a hoistway (4);
   a sensor (19) configured for determining a current position of the elevator car (6) within the hoistway (4);
   at least one stationary wireless communication module (20); and
   at least one mobile wireless communication module (22) attached to the elevator car (6);
   wherein the at least one stationary wireless communication module (20) and at the least one mobile wireless communication module (22) are configured for communicating with each other via a wireless data connection using one of a plurality of radio channels; and
   wherein the at least one stationary wireless communication module (20) and the at least one mobile wireless communication module (22) are configured for selecting the radio channel to be used for communicating from the plurality of radio channels based on the current position of the elevator car (6) within the hoistway (4);
   wherein a same radio channel is used for communicating between the at least one stationary wireless communication module (20) and the at least one mobile wireless communication module (22) at at least two adjacent floors along the hoistway.

2. Elevator system (2) according to claim 1, wherein the elevator system (2) is configured for performing a normal run, the normal run comprising:
   moving the elevator car (6) along the hoistway (4);
   determining the current position of the elevator car (6) within the hoistway (4);
   selecting a radio channel to be used for communicating via the wireless data connection based on the current position of the elevator car (6) within the hoistway (4).

3. Elevator system (2) according to claim 2, wherein the at least one stationary wireless communication module (20) and the at the least one mobile wireless communication module (22) are configured for selecting the radio channel to be used for communicating via the wireless data connection from a channel table (25) associating positions of the elevator car (6) with a radio channel.

4. Elevator system (2) according to claim 3, wherein the normal run further comprises:
   determining a radio channel allowing proper or best communication via wireless data connection from the plurality of radio channels at selected positions of the elevator car (6) within the hoistway (4); and
   updating the channel table (25) by storing the determined radio channel together with the selected associated positions of the elevator car (6) in the channel table (25).

5. Elevator system (2) according to claim 1, wherein the elevator system (2) is configured for performing a learning run, the learning run comprising:
   (i) moving the elevator car (6) along the hoistway (4);
   (ii) for a selected position of the elevator car (6) within the hoistway (4), determining a radio channel allowing proper or best communication via the wireless data connection from the plurality of radio channels;
   (iii) storing the determined radio channel together with the selected position of the elevator car (6); and
   (iv) repeating steps (ii) and (iii) for a selected number of different positions of the elevator car (6) within the hoistway (4).

6. Elevator system (2) according to claim 5, wherein a maximum speed of the elevator car (6) during the learning run is set slower than a maximum speed of the elevator car (6) during a normal run.

7. Elevator system (2) according to claim 1, wherein the elevator system (2) comprises a plurality of stationary wireless communication modules (20).

8. Elevator system (2) according to claim 7, wherein the stationary wireless communication modules (20) are distributed over a plurality of positions along the height of the hoistway (4).

9. Method of communicating via a wireless data connection between a mobile wireless communication module attached to an elevator car (6) traveling along a hoistway and a stationary wireless communication module, wherein the method comprises
   determining a current position of the elevator car (6) within the hoistway (4); and
   selecting a radio channel to be used for communicating via the wireless data connection between the mobile wireless communication module and the stationary wireless communication module from a plurality of radio channels based on the determined position of the elevator car (6);
   wherein a same radio channel is used for communicating between the stationary wireless communication module (20) and the mobile wireless communication module (22) at at least two adjacent floors along the hoistway.

10. Method according to claim 9, wherein the radio channel used for communicating via the wireless data connection is selected from a channel table (25) associating positions of the elevator car (6) with a radio channel.

11. Method according to claim 10, wherein the method further comprises:
    determining a radio channel allowing proper or best communication at selected positions of the elevator car (6); and
    updating the channel table (25) by storing the determined radio channel together with the respective associated positions of the elevator car (6) in the channel table (25).

12. Method according to claim 9, wherein the method further comprises performing a learning run, the learning run comprising:
    (i) moving the elevator car (6) along the hoistway (4);
    (ii) for a selected position of the elevator car (6) within the hoistway (4), determining a radio channel allowing proper or best communication;
    (iii) storing the determined radio channel together with the selected position of the elevator car (6);
    (iv) repeating steps (ii) and (iii) for a selected number of different positions of the elevator car (6) along the hoistway (4).

13. Method according to claim 12, wherein a maximum speed of the elevator car (6) during the learning run is set slower than a maximum speed of the elevator car (6) during a normal run.

14. Method according to claim 9, wherein the method further comprises switching between a plurality of stationary wireless communication modules (20) based on the determined position of the elevator car (6).

15. Method according to claim 14, wherein the stationary wireless communication modules (20) are distributed over a plurality of positions along the height of the hoistway (4).

\* \* \* \* \*